US011328341B2

United States Patent
Owens

(10) Patent No.: US 11,328,341 B2
(45) Date of Patent: May 10, 2022

(54) SYSTEM AND METHOD FOR INDIVIDUALS IN A SOCIAL NETWORK TO GIFT OR REQUEST TO RECEIVE FOOD AND BEVERAGE ITEMS VIA MOBILE APPLICATIONS CONNECTED TO POINT OF SALE SYSTEMS

(71) Applicant: Deshon Owens, Sherman Oaks, CA (US)

(72) Inventor: Deshon Owens, Sherman Oaks, CA (US)

( * ) Notice: Subject to any disclaimer, the term of this patent is extended or adjusted under 35 U.S.C. 154(b) by 0 days.

(21) Appl. No.: 16/213,389

(22) Filed: Dec. 7, 2018

(65) Prior Publication Data

US 2021/0312527 A1 Oct. 7, 2021

Related U.S. Application Data

(60) Provisional application No. 62/708,400, filed on Dec. 7, 2017.

(51) Int. Cl.
| | |
|---|---|
| *G06Q 20/38* | (2012.01) |
| *G06Q 30/06* | (2012.01) |
| *G06Q 50/00* | (2012.01) |
| *G06Q 20/32* | (2012.01) |
| *G06Q 20/20* | (2012.01) |
| *H04L 51/52* | (2022.01) |
| *G06F 3/0482* | (2013.01) |
| *G06Q 20/12* | (2012.01) |
| *G06Q 30/02* | (2012.01) |
| *G06Q 40/02* | (2012.01) |

(52) U.S. Cl.
CPC ....... *G06Q 30/0633* (2013.01); *G06Q 20/202* (2013.01); *G06Q 20/3224* (2013.01); *G06Q 20/384* (2020.05); *G06Q 20/386* (2020.05); *G06Q 30/0639* (2013.01); *G06Q 50/01* (2013.01); *H04L 51/32* (2013.01); *G06F 3/0482* (2013.01); *G06Q 20/127* (2013.01); *G06Q 30/0222* (2013.01); *G06Q 30/0259* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 2011/0047039 A1* | 2/2011 | Crames | G06Q 30/02 705/18 |
| 2012/0158589 A1* | 6/2012 | Katzin | G06Q 20/384 705/44 |

* cited by examiner

*Primary Examiner* — Paul Danneman
(74) *Attorney, Agent, or Firm* — Kenechi R. Agu

(57) ABSTRACT

The present invention relates to a system and method for individuals of social network service to transmit or receive digital gift items via mobile applications connected to merchant point of sale systems. The social networking service stores data pertaining to a plurality of merchant and customers subscribing to services of a social networking service. The social networking service may receive a request from a first user to send a digital gift, which represents a good or service offered by a merchant, to a second user. The social networking service transmits a representation of the digital gift and an interactive element to a second user for enabling the second user to accept the digital gift. Upon receiving an indication that the second user has accepted the digital gift, the social networking service is configured to instantly generate a communication channel for the second user to contact the first user, and also facilitate processing of a payment associated for the digital gift.

18 Claims, 8 Drawing Sheets

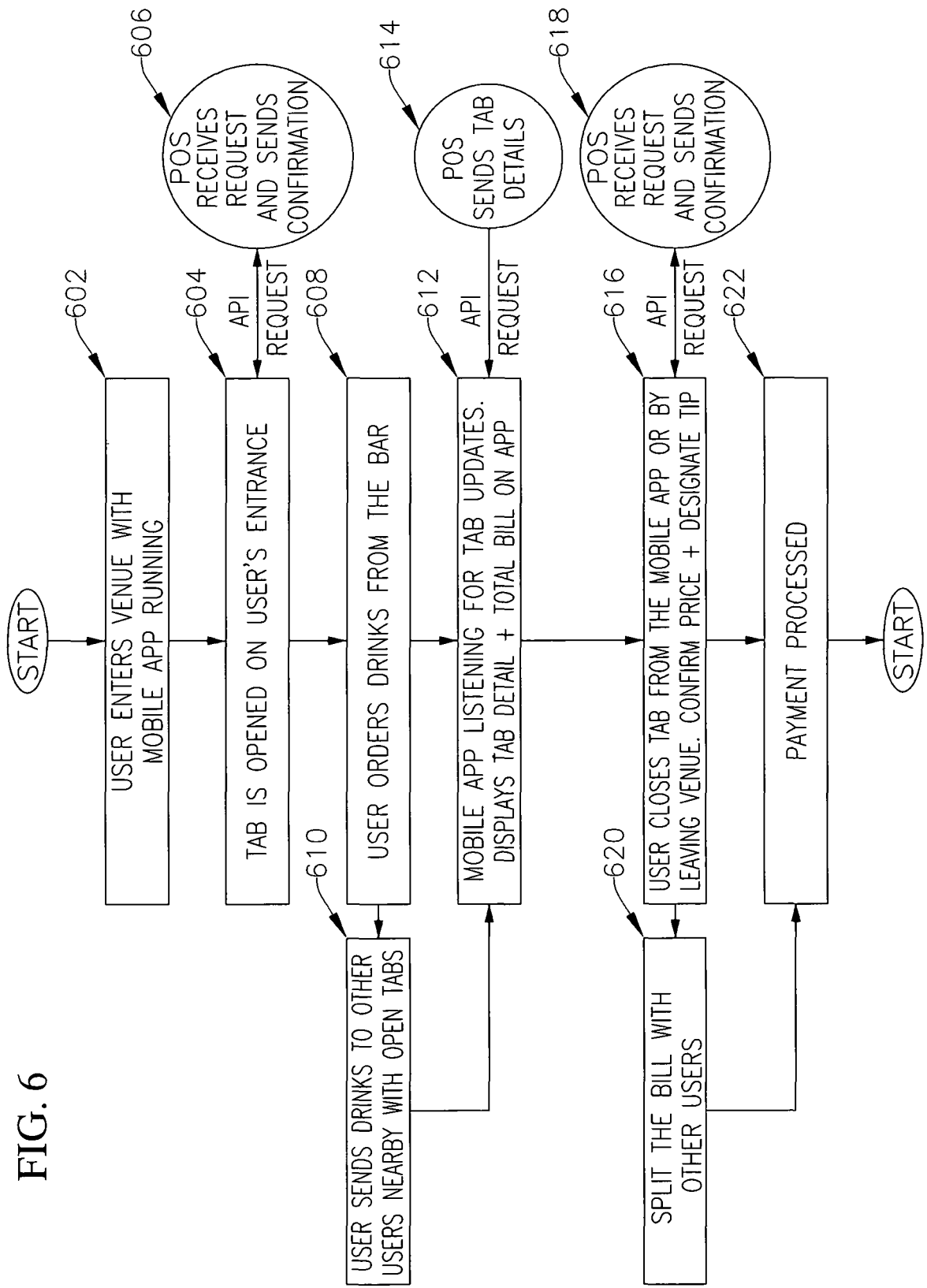

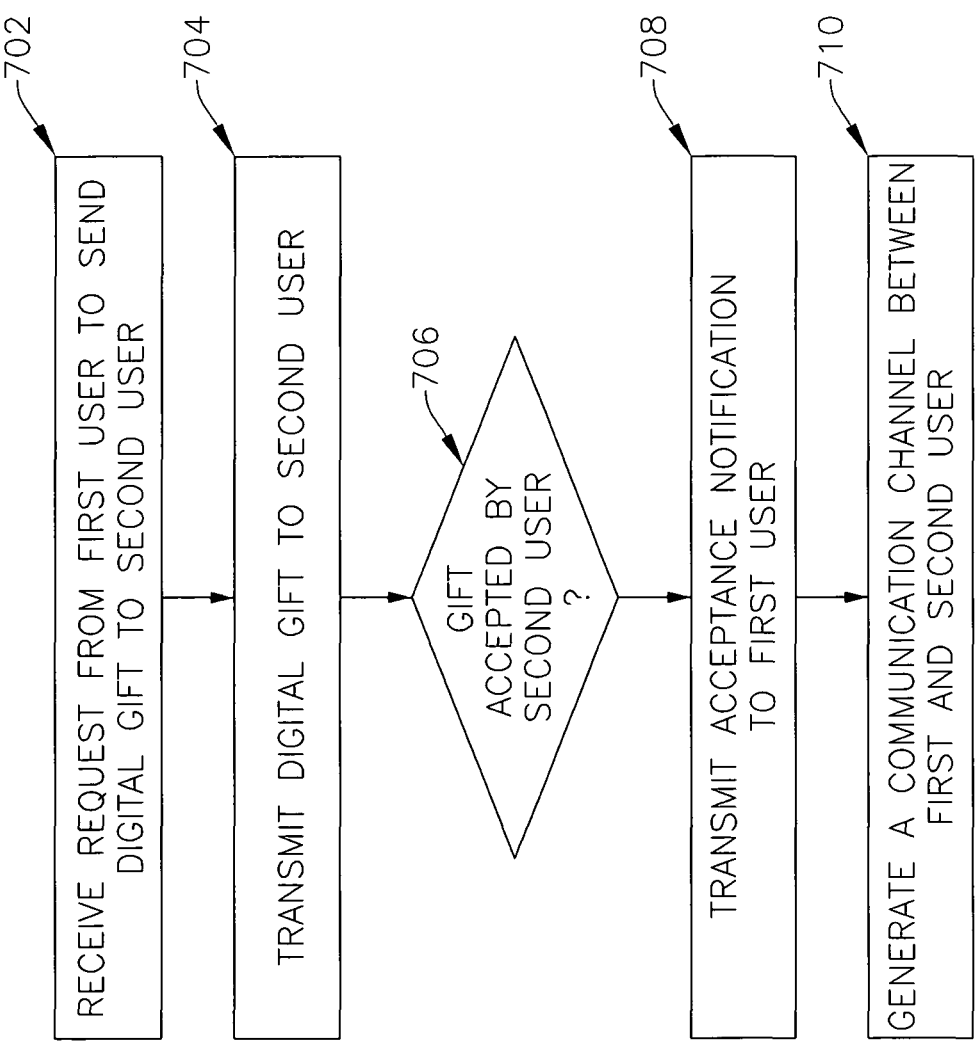

SYSTEM AND METHOD FOR INDIVIDUALS IN A SOCIAL NETWORK TO GIFT OR REQUEST TO RECEIVE FOOD AND BEVERAGE ITEMS VIA MOBILE APPLICATIONS CONNECTED TO POINT OF SALE SYSTEMS

CROSS-REFERENCE TO RELATED APPLICATIONS

This application claims priority to U.S. Provisional Application No. 62/708,400 filed on Dec. 7, 2017, which is expressly incorporated by referenced herein in its entirety.

BACKGROUND

Embodiments of this invention are methods for individuals in a defined social network to gift or request to receive food and beverages from one another via mobile applications that are connected to a point of sale system. Specifically, embodiments of this invention are a mobile-based platform that allows individuals to set preferences for food and beverages allowing them to view offers and discounts from establishments within a defined geographic area and then: (1) gift food and/or beverages to another individual by purchasing the item via a mobile application that is connected to a point of sale system where the receiving individual is located; or (2) request to receive food and/or beverage from another individual allowing the other party to purchase the item via a mobile application that is connected to a point of sale system where the receiving individual is located.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

FIG. 6 is an example swim lane and flow chart diagram of user opening and closing a tab in accordance with an embodiment of the present invention.

FIG. 7 is an example flow chart of the processing steps for generating a communication channel between users in accordance with an embodiment of the present invention.

DESCRIPTION OF INVENTION

There are no inventions that provide methods for individuals in a defined social network to give or request food and beverages from one another via mobile applications that are connected to a point of sale system.

The invention connects merchant and/or establishments (such as restaurants and bars) looking to advertise discounted food and beverage items to individuals looking for discounted food and beverage items within a defined geographic area. The invention also connects individuals within a defined geographic area that are looking to create new relationships with others by allowing them to gift or request to receive food and beverage items from each other via a mobile application connected to the point of sale system.

Figure 1A:
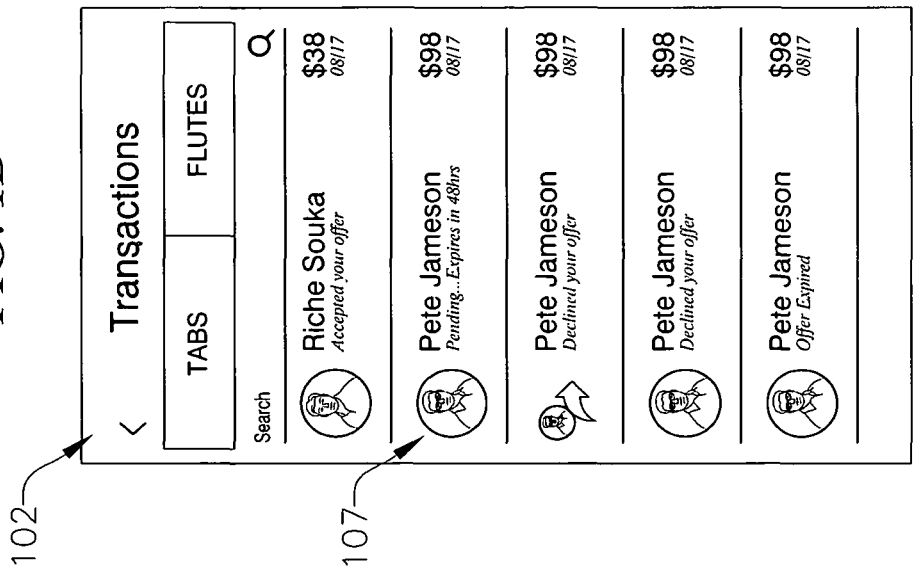
FIGS. 1A and 1B illustrates an example user interface of a new user account set-up and transaction history associated with the system of the present invention.
Figure 1B:
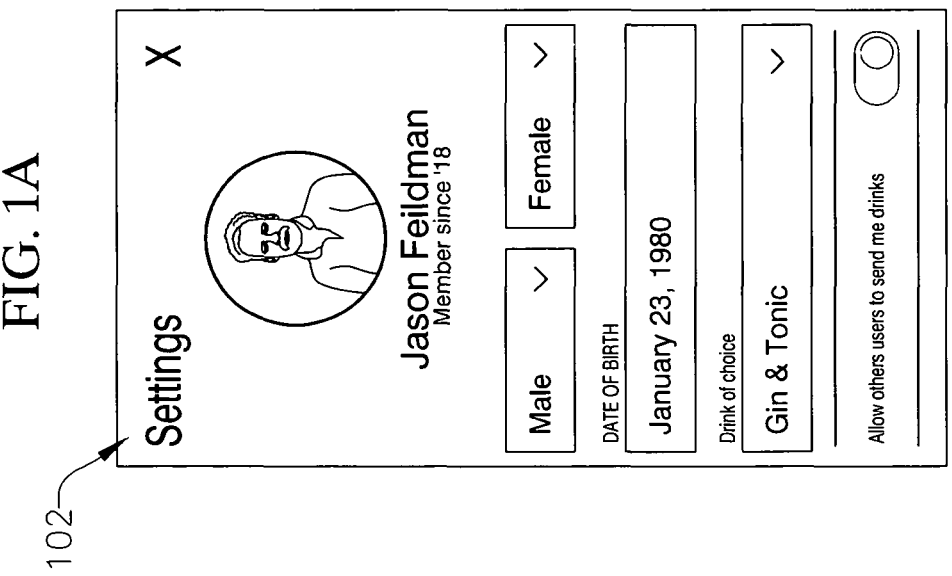

FIGS. 1A and 1B illustrate example user interfaces of a new user account set-up and transaction history associated with the system of the present invention. As depicted in FIG. 1A, the social networking service system described herein is used to provide a mobile application and user interface 102 to enable a customer to sign up for the social networking service. If the user already has an account, the user will be able to input a username and password to access the account. If their credentials are incorrect, the mobile application will notify the user that the username or password is not recognized and to try again. If the user does not have an account, they can go through a sign up flow and set up the initial user profile including selecting their drink of choice, personal information, payment information so as to allow others to gift or request food and beverage items offered by merchants utilizing services of the social networking service. If a user is already registered, the user can log in to see their transaction history of sending and receiving digital gifts using the social networking service as shown in FIG. 1B.

Figure 2A:
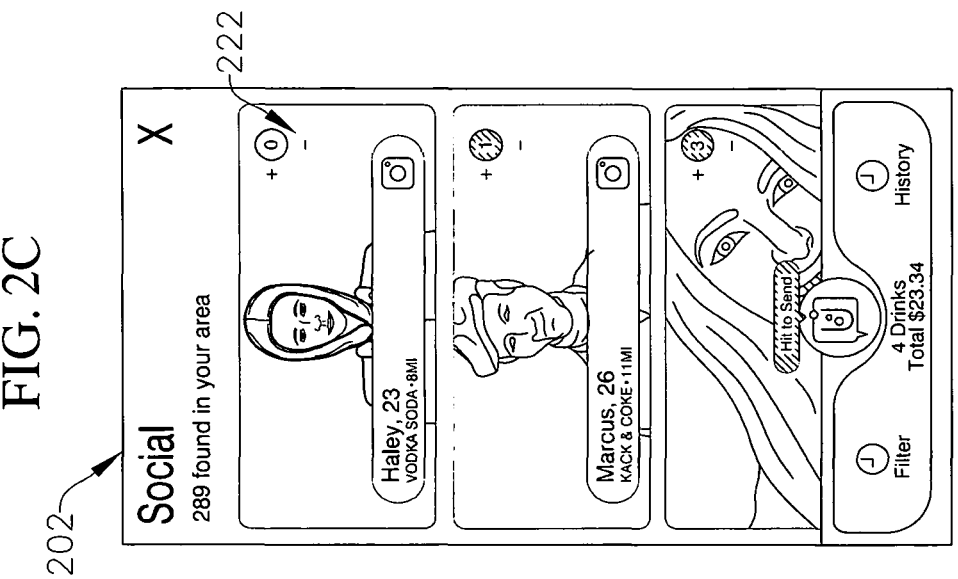
FIGS. 2A-2C are example user interfaces for enabling users to search for nearby users and merchants utilizing the system of the present invention.
Figure 2B:
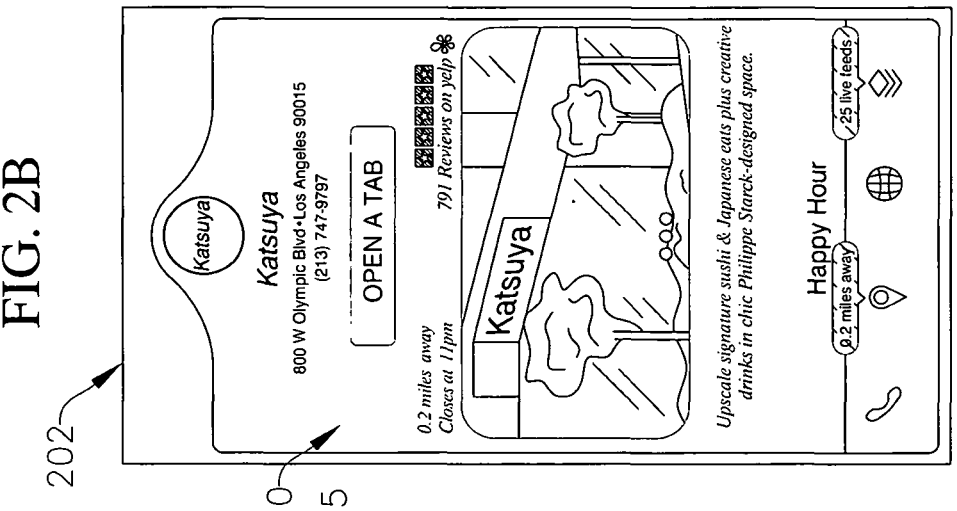
Figure 2C:
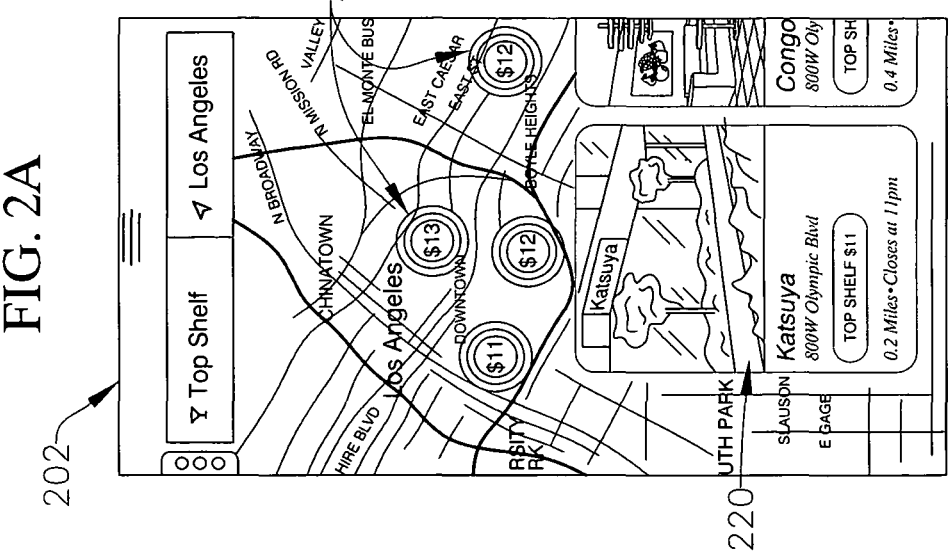

FIGS. 2A-2C are example user interfaces for enabling users to search for nearby merchants utilizing the system of the present invention. As shown in FIG. 2A, the present system allows the user to choose a preferred type of food and/or beverage option within a certain radius view. The user may also choose the type of offers or deals that they would like to view from establishments in a certain radius. The user will be able to specify food and drink deals and offer preferences in order to filter deals and offers. After an individual registers with the mobile application (including creating a profile and selecting a payment method), the user opens the mobile application and may view a map view of establishments offering discounted food and beverages within a defined geographic area (FIG. 2A), or a list view of other users in their social network (FIG. 2C) and within a defined geographic area. The user may select a particular merchant from the listed merchants 220 and view additional merchant details 210 for that merchant. As shown in FIG. 2A, users can view profiles and prices of items 205 offered for sale by merchants subscribing to the services of the platform. From a list or map view, the user can click on an establishment to view details such as a description of the venue, address, and hours of operation as shown in FIG. 2B. Moreover, once the user is within a certain distance of the establishment, the user has the option to open a tab via smartphone or other mobile device and order food or beverage items once the user is present at the establishment.

In accordance with example of the present invention, the user may select an establishment that he/she would like to visit and the mobile application allows the user to electronically "open a tab" at that establishment. In one example, the tab will automatically open when a user is physically located near a participating establishment. The mobile application communicates with the establishment's POS system via a software module provided by the social networking service and installed on the merchant's POS system. The POS system receives the request and sends confirmation to the mobile application to confirm that the tab is open.

In accordance with one example, the social networking system enables user to engage with others within a defined radius view as shown in FIG. 2C. After viewing various other users within a defined radius, the application allows the user to select certain users to gift food or beverage items to (or request to receive beverages from). A user may select a desired user to view more details and instantly pay for a preexisting tab belonging to that user. The recipient user of the gift offer has the choice to accept or deny the gift or request via the user interface of the mobile application. If the end user accepts the request, a communication channel or chat interface will automatically be initiated between the two users. In one example embodiment, the social networking system may show a group tab belonging to a group of users and enable another user to pay for the entire tab for the group using the platform of the present invention. In this scenario, the social networking service may initiate three-way or larger communication channel (e.g., group chat thread) between all the members of the group tab and the paying user.

Figure 3C:
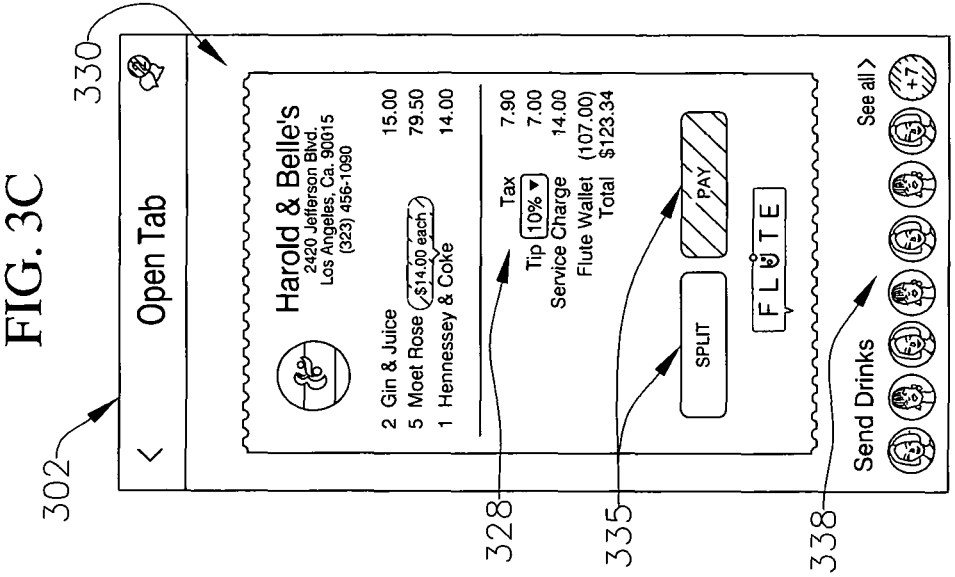
FIGS. 3A-3C are example user interfaces of a user splitting a tab and providing a tip utilizing the system of the present invention.
Figure 3B:
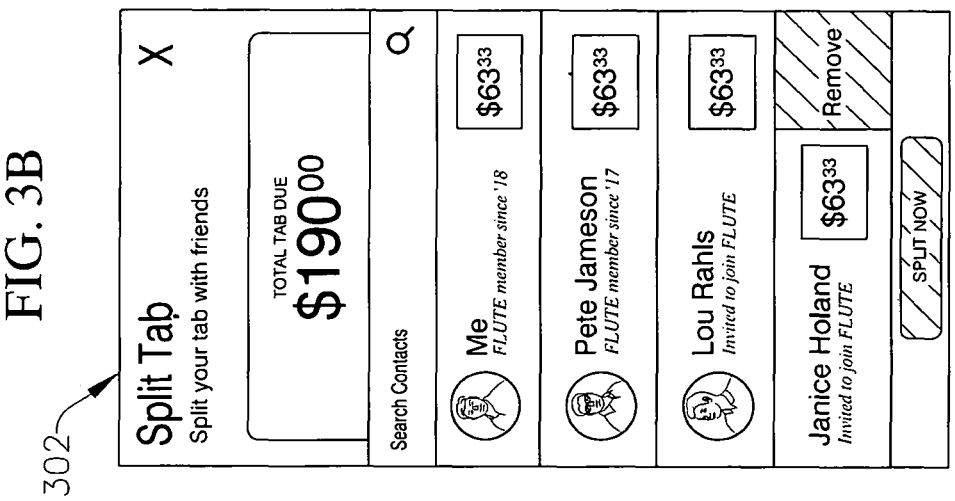
Figure 3A:
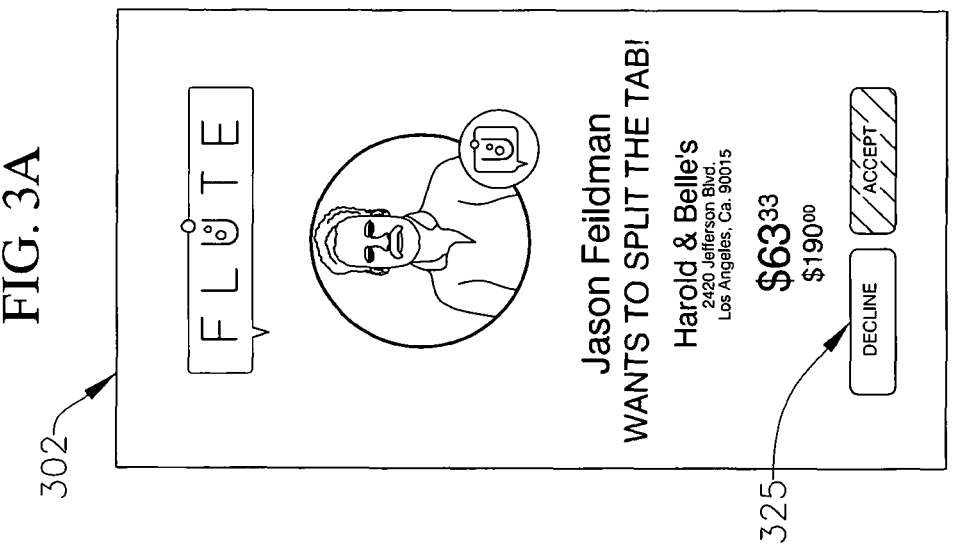

FIGS. 3A-3C are example user interfaces of a user splitting a tab and providing a tip utilizing the system of the present invention. Once the user is physically located within a certain distance of the establishment, the mobile application allows the user to electronically "open a tab" and order food and/or drinks once the user is present at the establishment. As shown here, the user can an open tab 330 on the mobile application, including the ability to close the tab and add gratuity via tip selector 328 of the user interface 302. As the user orders food and beverage items from the establishment worker (e.g., orders a drink from a bartender), the digital tab 430 of the user interface is updated to list additional items and the establishment worker enters the order into the establishment's POS system so that a waiter or bartender may deliver the item in the normal course. In accordance with one example of the present invention, the POS system is continuously sending the tab details to the mobile application, including type of food or beverage item ordered and the running total. As shown in FIG. 3A, the user can receive an offer to split a tab and agree or decline to split the tab with another user of the mobile application via interface buttons 325. The user may view the details of the split bill as shown in FIG. 3B, and can then close out the tab by selecting the associated interface button 335 depicted in FIG. 3C so as to trigger processing of payment for the total payment amount including the selected tip amount. Still further and in accordance with example, the tab may be automatically closed when the user physically leaves the establishment. When a tab is closed, the mobile application may send confirmation to the establishment's POS system that payment has been made.

Figure 4A:
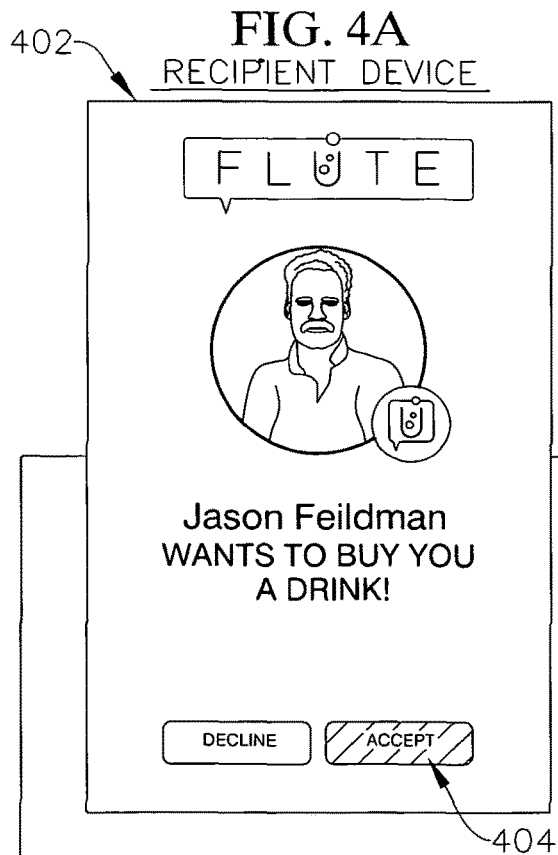
FIGS. 4A-4D are example user interfaces for a sender and a recipient when sending a digital gift through the system of the present invention.
Figure 4B:
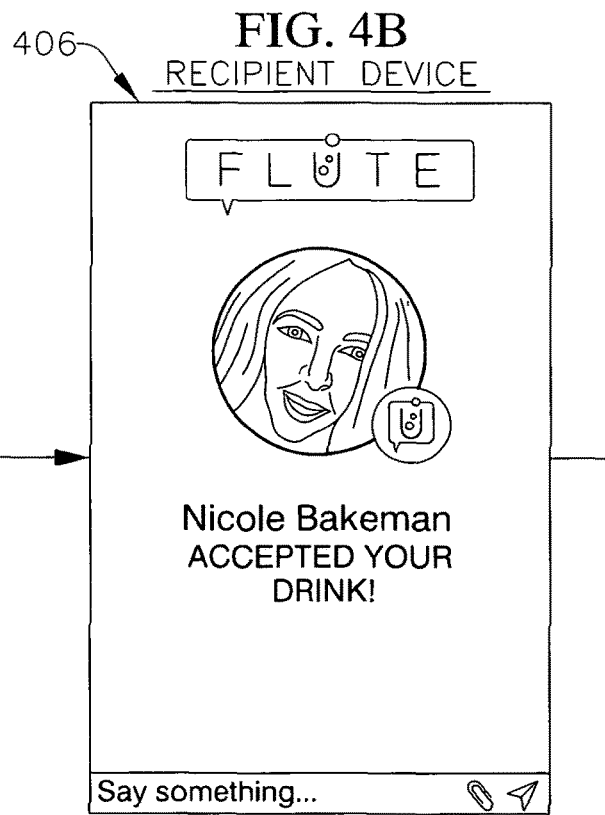
Figure 4C:
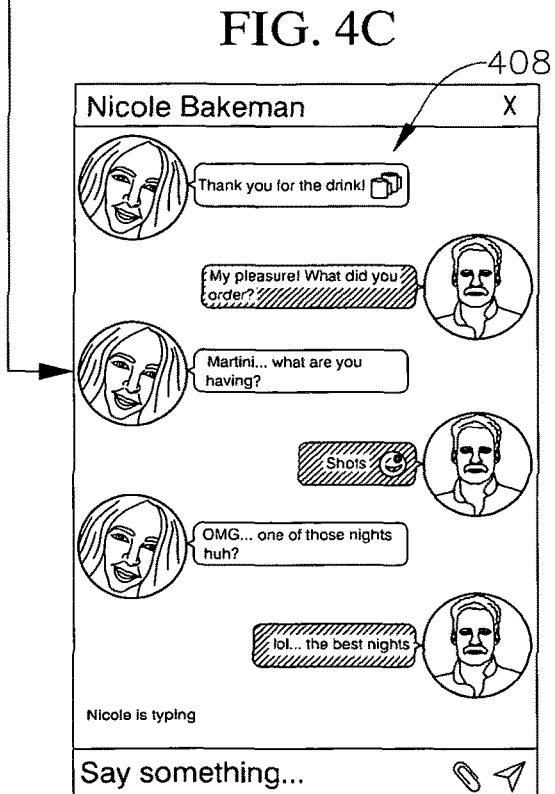
Figure 4D:
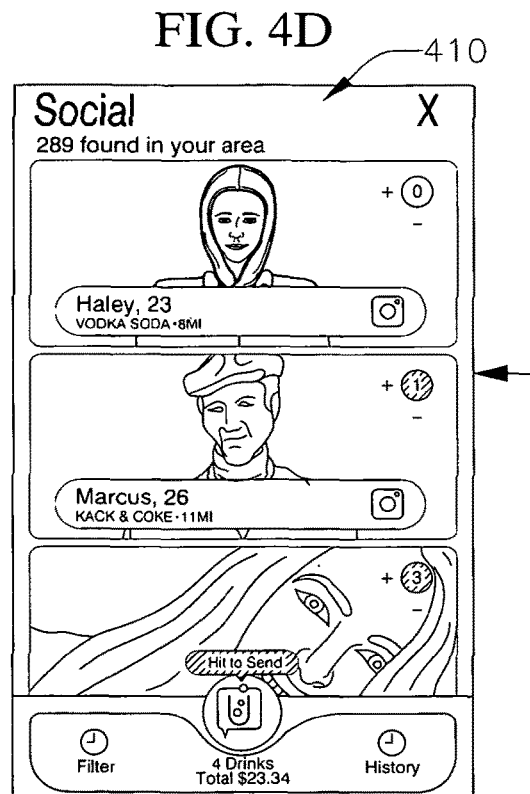

FIGS. 4A-4D are example user interfaces for a sender and a recipient when sending a digital gift through the system of the present invention. A first or sending user may send a digital gift to a recipient using the mobile application. As shown in FIG. 4A, the system provides instructions to the mobile application of the recipient user to display a notification of digital gift on the user interface 402. The notification includes information of the sender, the digital gift, an interactive button 404 to enable the recipient user to accept the digital gift. If the recipient user accepts the digital gift request from the sender, then the social networking system instantly sends a notification message to the sending user as shown in FIG. 4B, and also generates a communication channel between the first user and the second user as shown in FIG. 4C. The communication channel is generated with the mobile application of the sender and recipient and may be a text chat, phone call, video chat, or other communication mechanism. Once the communication channel is established, the application also allows the two users to exchange other information according to their preferences (e.g., exact location, other social network profiles, and contact information). The exact location of the other party may not be automatically disclosed to the other party without consent. Still further, upon receiving an indication that the recipient has accepted the digital gift, the recipient user is added to a list of the sender's social contacts as shown in FIG. 4D.

In one embodiment, the digital gift of a food or beverage item is a credit within the application against the users' open tab up to a defined amount. The application does not push any information regarding the gift credit to the establishment's POS system. Instead, the establishment's POS system via the integrated module pushes the tab details to the application and the application applies the gift credit to the tab when the tab is closed out. If the recipient user orders a food or beverage item that is higher than the defined amount, then the recipient user pays for the difference when the tab closes.

Figure 5B:
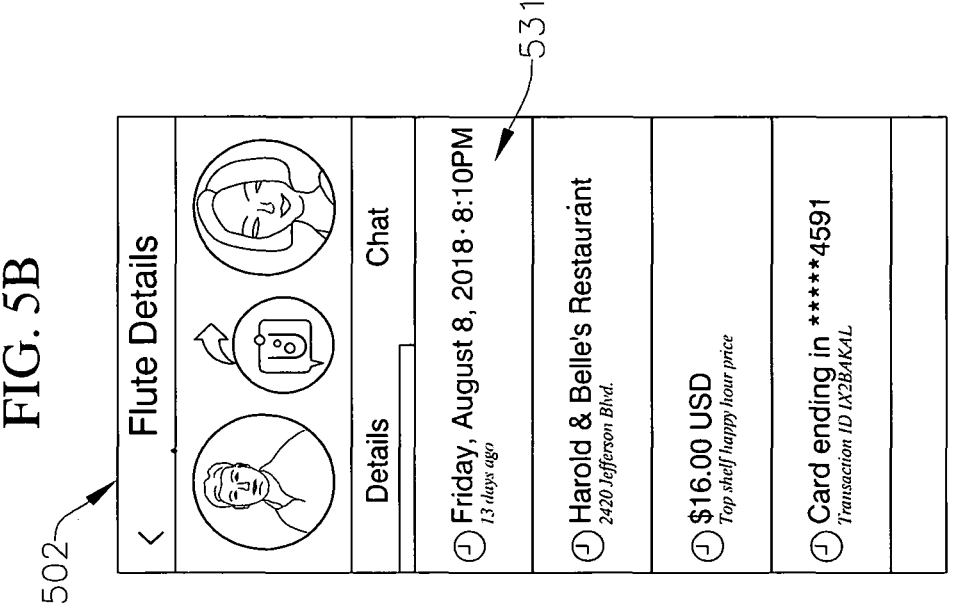
FIGS. 5A and 5B are example user interfaces relating to a user's digital wallet and chat history in accordance with example of the present invention.
Figure 5A:
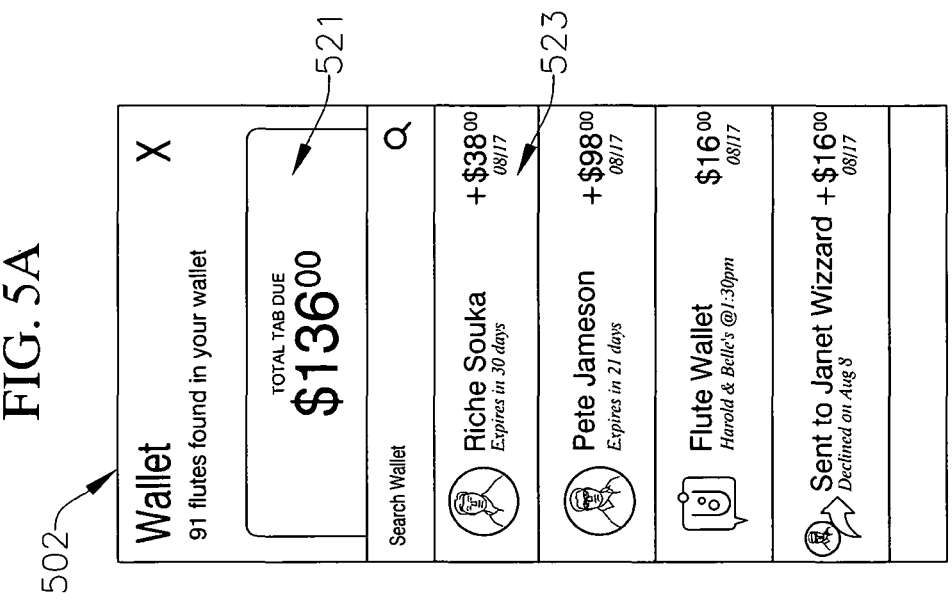

FIGS. 5A and 5B are example user interfaces relating to a user's digital wallet and chat history in accordance with example of the present invention. As shown in FIG. 5A, an example user interface 502 provided on the mobile application may include a stored balance 521. This stored balance relates to a current purchase value available to the user. The purchase value may be a value added by user via a linked debit or credit card and/or a combined value of digital gifts received from other users. The user interface 502 may also include transaction history view 523 listing previous incoming and outgoing gift offers from other users. In FIG. 5B, the user may click select a particular transaction to view offer details 523 including the date, time, merchant location, amount and the payment instrument used for the purchase.

FIG. 6 is an example swim lane and flow chart diagram of user opening and closing a tab in accordance with an embodiment of the present invention. In step 602, the social networking service may detect that a user has entered a merchant establishment via the mobile application downloaded on the user mobile phone. Detection of a user's presence at the merchant location may be based on the geolocation of the device and a known location of the merchant, geofence, beacon detection, or the like. In step 604, the social networking service opens a tab on behalf of the user through communication with the social networking interface module installed on the merchant's POS and an application programing interface provided by the social networking service. The POS receive the tab open request from the mobile application via the API and sends a confirmation message in step 606. Once the tab is open, the user may order items from the establishment such as food and drinks and have these items added to their digital tab. Additionally, in step 610, the user may search for other users within the establishment and send digital gifts (e.g., drinks, food, etc.) via the user interface of the mobile application to one or more other users of the social networking service. As the recipient user(s) accept the digital offers from the sending user, the mobile application updates the tab details and total bill amount in step 612. The updated tab amount is then transferred to the merchant POS system via the API and software networking module in step 614. Thereafter, in step 616, the user may close the opened tab using their mobile application (e.g., select close tab button on the user interface), or by leaving the venue (e.g., detecting that a geolocation of the user's mobile device is no longer proximate to the merchant's known location). The user also has the option to split the tab with other users by selecting individual users from the user interface and inviting those selected users to split the bill as previously described with respect to FIGS. 3A-3C (step 620). Once the tab is finalized including split bill arrangement and any tip amounts, the social networking service uses the stored payment information of the one or more paying users and processes payment for the transaction in step 622.

FIG. 7 is an example flow chart of the processing steps for generating a communication channel between users in accordance with an embodiment of the present invention. In step 702, the social network service receives a request from the first user via the mobile application and device to send a digital gift to a second user. As discussed above, the digital gift represents an item, good or service offered by the merchant. In step 704, the social networking service transmits a notification and representation of the digital gift to the second user. The notification should include an interactive element that enables the second user to accept the digital gift. If the social networking service determines, in step 706, that the second user has accepted the offer (e.g., user selects a "accept" button on the user interface), the social networking service instantly generates a communication channel for the second user to contact the first user via the user interface of the mobile device in step 708. In one example, contemporaneously with the second user's acceptance of the offer, in step 710 the social networking service facilitates processing of a payment associated with the one or more digital gifts or tab based on the payment information stored in the customer profile of the first user. However, payment processing of the digital gift could also occur at a time when the first user requests to send the digital gift to the second user, or upon the social networking service receiving an indication that the merchant has delivered the actual good or item to the second user (e.g., via the merchant POS). Alternatively, the service may send an authorization request at one point of time (e.g., time of requesting digital gift), and then process a capture for the digital gift at a later point of time (e.g., user acceptance or good delivery).

Figure 8:
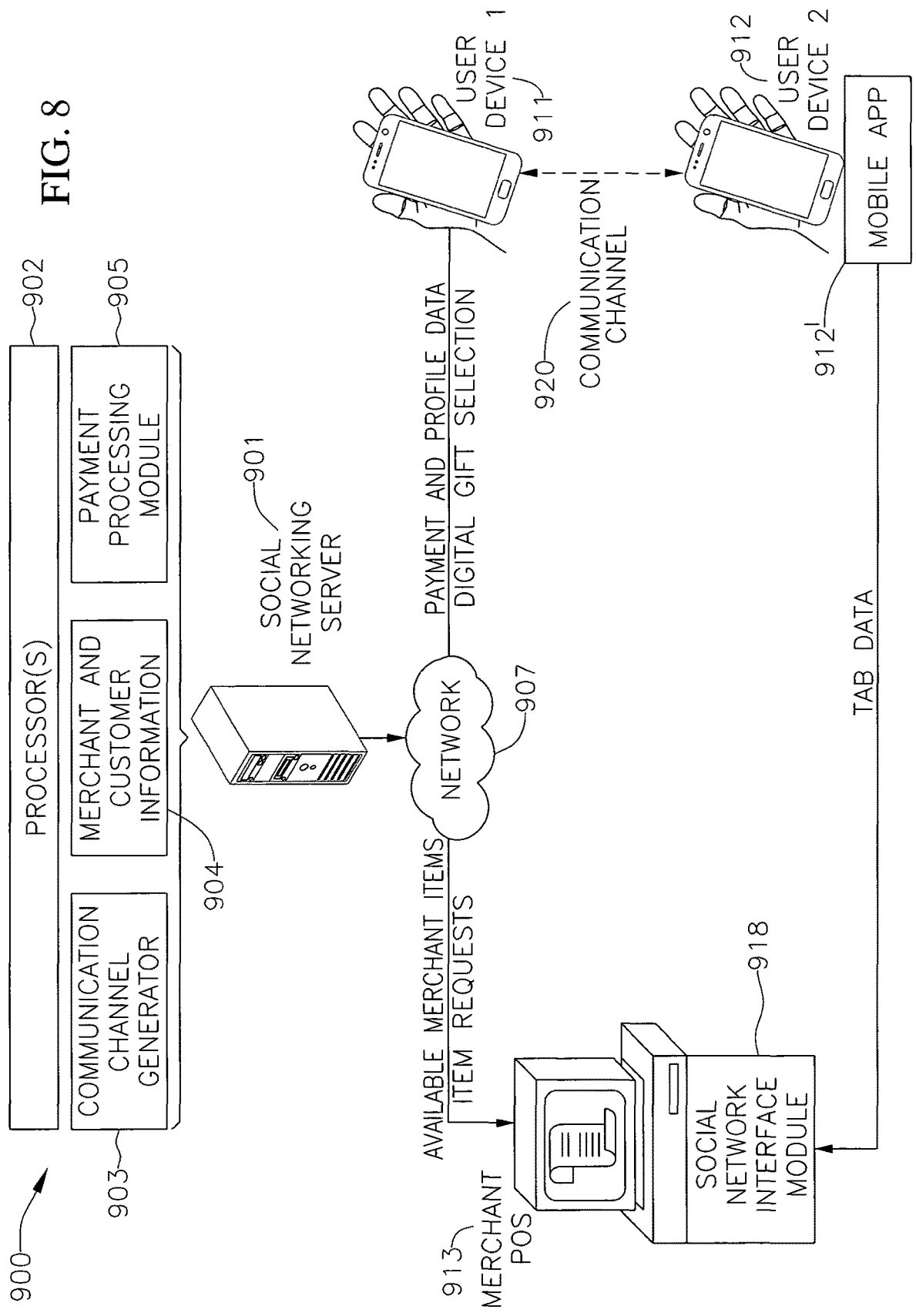
FIG. 8 illustrates an example operating environment of the social networking service in accordance with an embodiment of the present invention

FIG. 8 illustrates an example operating environment of the social networking service in accordance with an embodiment of the present invention. As shown here, the social networking service 900 includes a social networking server 901 and an operating point-of-sale (POS) device 913 of a merchant used to engage in various transactions with customers, such as an example customers utilizing mobile devices 911 and 912. The POS device 913 includes a social network interface module 918 installed therein for communicating with the social networking server 901 via network 907. POS device 913 may comprise any sort of mobile or non-mobile device that includes an instance of a merchant application that executes on the respective device.

As described above, the merchant may include any business engaged in the offering of goods or services for acquisition by customers. Customers may include users operating their own mobile device 911 and 912, each respectively having an instance of a mobile application 911' and 912' installed thereon. The mobile application may be downloaded from a central application server or over the internet directly from the social networking server 901. The customers may acquire goods or services from a merchant, such as by purchasing, renting, leasing, borrowing, licensing, or the like. In one example, goods and/or services offered by merchants may be referred to as items. Thus, a merchant and a customer may interact with each other to conduct a transaction in which the customer acquires an item from a merchant, and in return, the customer provides payment to the merchant using the social networking service 900.

The social networking service may use stored customer information including payment data to facilitated payment for the goods or services over the network 907. The network 907 may represent any one or more wired or wireless networks, such as a WiFi network, a cellular network, or the like. In an online transaction, the social networking server 901 may send payment information to the POS system 913, and vice versa, over the network 907 substantially contemporaneously with the acceptance of the digital gift by the second user. Upon detecting that a user (e.g., 912) has accepted the digital gift from another user (e.g., 911), the social networking server 901 generates a communication channel 920 for the two users to contact each other by opening a chat user interface on both mobile application 911' of user device 911 and mobile application 912' of user device 912.

As illustrated, the social networking server 901 may include one or more processors 902, communication channel generator 903, merchant and customer data store 904, and payment processing module 905. The payment processing module 905 may function to retrieve stored payment information from the customer data store 904 and attempt to authorize the payment instrument for an identified transaction involving a tab.

Generally, when a customer and a merchant enter into an electronic payment transaction, the transaction is processed by electronically transferring funds from a financial account associated with the customer to a financial account associated with the merchant. As such, the payment processing module 905 may communicate with one or more computing devices of a card network (or "card payment network"), e.g., MasterCard®, VISA®, over the network 907 to conduct financial transactions electronically. The payment processing module 905 can also communicate with one or more computing devices of one or more banks, processing/acquiring services, or the like over the network 907. For example, the payment processing module 905 may communicate with an acquiring bank, and/or an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The social network server 901 may determine the identity of the user 911 at the premises of the merchant 913 in many ways. In one embodiment, computing devices associated with the merchant (e.g., POS device 913, servers of the merchant, etc.) determine when a customer visits physical premises or a digital presence of the merchants. For instance, the customer device 912 may include an application 912' provided by the payment service 90) that communicates with the POS device 913 via near-field communication methods (e.g., Bluetooth, Beacons, Geofence, etc.). Therefore, when the customer visits the physical premises of the merchant, for example, the POS device 913 may detect the presence of the customer device 911 or 912 and accordingly determine that the associated customer is present within the establishment. In another example, one or both of the POS device 911 and the customer device 912 may share its location (e.g., GPS coordinates) to one another or to a common service for determining when the devices are located within a threshold proximity of one another.

As discussed above, customer devices 911 and 912 include instances of a mobile application 911' and 912' respectively, which are provided by the social networking server 901 and allow the customers 911 and/or 912 to pay for items at the merchant POS 913 using the application 911' via interface module 918. In these instances, the mobile applications 911' and/or 912' on the customer device 911' and 912' are linked to one or more payment instruments of the customer as stored in the merchant and customer profile database 904.

In another example, the customer may utilize the customer device 911 to "check in" at the merchant location, and the POS device 913 may receive an indication of this check in. Of course, while a few examples are listed, it is to be appreciated that the social networking server 901 and/or merchant device 913 may determine when a customer (e.g., user device 911 or 912) is present at the merchant establishment in any other number of ways.

As previously stated, each of the above discussed scenarios is merely an example and many variations are possible. Moreover, many variations of the techniques discussed above are possible as well without departing from the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system for transmitting digital gifts on a social networking platform, the system comprising:
   one or more processors; and
   one or more computer-readable media storing:
      a plurality of merchant records and plurality of customer records subscribing to services of a social networking service, wherein the plurality of merchant records includes item information associated with goods and services offered for sale by a merchant; and
      instructions executable by the one or more processors, wherein the instructions program the one or more processors to:
         receive, by the social networking service and from a mobile application executing on a mobile device associated with a first user, a request from the first user to send a digital gift to a second user, wherein the digital gift represents a good or service offered by the merchant;
         transmit, by the social networking service and to a mobile application executing on a mobile device of the second user, a representation of the digital gift and an interactive element to enable the second user to accept the digital gift;
         upon receiving an indication that the second user has accepted the digital gift:
            instantly generating, by the social networking service, a communication channel for the second user to contact the first user via the mobile device,
            adding, via the social networking service, the second user to a social contact list associated with the first user and maintained the social network service; and
            applying, via an interface module provided by the social networking service and executing on a point of sale (POS) of the merchant, a payment amount associated with the digital gift to a preexisting tab associated with second user and maintained by the merchant; and
         facilitate, by the social network service, processing of the payment amount associated with the digital gift based on payment information stored in the customer record associated with the first user.

2. The system of the claim 1, wherein the payment for the digital gift is not processed until the second user accepts the digital gift.

3. The system of claim 1, further comprising:
   providing, by the payment service and on a user interface associated with the mobile device of the first user, a map interface including a location of one or more merchants or at least one user within a predefined distance.

4. The system of claim 1, further comprising:
   providing, by the payment service and on a user interface associated with the mobile device of the first user, a list view including one or more other merchants or one more other users within a predefined distance.

5. The system of claim 1, wherein the merchant communicates to the first user and the social network service via the interface module.

6. The system of claim 1, wherein the generated communication channel is a text message chat interface provided on the mobile application of the first user and the mobile application of the second user.

7. One or more non-transitory computer-readable media storing instructions executable by one or more processors, wherein the instructions program the one or more processors to implement a service to:
   receive, by the social networking service and from a mobile application executing on a mobile device associated with a first user, a request from the first user to send a digital gift to a second user, wherein the digital gift represents a good or service offered by the merchant;
   transmit, by the social networking service and to a mobile application executing on a mobile device of the second user, a representation of the digital gift and an interactive element to enable the second user to accept the digital gift;
   upon receiving an indication that the second user has accepted the digital gift;
      instantly generating, by the social networking service, a communication channel for the second user to contact the first user via the mobile device;
      adding, via the social networking service, the second user to a social contact list associated with the first user and maintained the social network service; and
      applying, via an interface module provided by the social networking service and executing on a point of sale (POS) of the merchant, a payment amount associated with the digital gift to a preexisting tab associated with second user and maintained by the merchant; and facilitate, by the social network service, processing of a payment associated with the digital gift based on payment information stored in the customer record associated with the first user.

8. The one or more non-transitory computer-readable media of the claim 7, wherein the payment for the digital gift is not processed until the second user accepts the digital gift.

9. The one or more non-transitory computer-readable media of claim 7, further comprising:
providing, by the payment service and on a user interface associated with the mobile device of the first user, a map interface including a location of one or more merchants or at least one user within a predefined distance.

10. The one or more non-transitory computer-readable media of claim 7, further comprising:
providing, by the payment service and on a user interface associated with the mobile device of the first user, a list view including one or more other merchants or one more other users within a predefined distance.

11. The one or more non-transitory computer-readable media of claim 7, wherein the merchant communicates to the first user and the social network service via the interface module.

12. The one or more non-transitory computer-readable media of claim 7, wherein the generated communication channel is a text message chat interface provided on the mobile application of the first user and the mobile application of the second user.

13. A computer-implemented method comprising:
receive a request from the first user to send a digital gift to a second user, wherein the digital gift represents a good or service offered by the merchant;
transmit a representation of the digital gift and an interactive element to enable the second user to accept the digital gift;
upon receiving an indication that the second user has accepted the digital gift:
instantly generating a communication channel for the second user to contact the first user via the mobile device;
adding the second user to a social contact list associated with the first user and maintained the social network service; and
applying, via an interface module provided by the social networking service and executing on a point of sale (POS) of the merchant, a payment amount associated with the digital gift to a preexisting tab associated with second user and maintained by the merchant; and
facilitate processing of a payment associated with the digital gift based on payment information stored in the customer record associated with the first user.

14. The method of the claim 13, wherein the payment for the digital gift is not processed until the second user accepts the digital gift.

15. The method of claim 13, further comprising:
providing, by the payment service and on a user interface associated with the mobile device of the first user, a map interface including a location of one or more merchants or at least one user within a predefined distance.

16. The method of claim 13, further comprising:
providing, by the payment service and on a user interface associated with the mobile device of the first user, a list view including one or more other merchants or one more other users within a predefined distance.

17. The system of claim 13, wherein the merchant communicates to the first user and the social network service via the interface module.

18. The system of claim 13, wherein the generated communication channel is a text message chat interface provided on the mobile application of the first user and the mobile application of the second user.

* * * * *